Jan. 12, 1971     J. L. REYNOLDS ET AL     3,555,545
SYSTEM OF RECORDING IN RADIATION SENSITIVE MEDIUM
Filed July 12, 1966     2 Sheets-Sheet 2
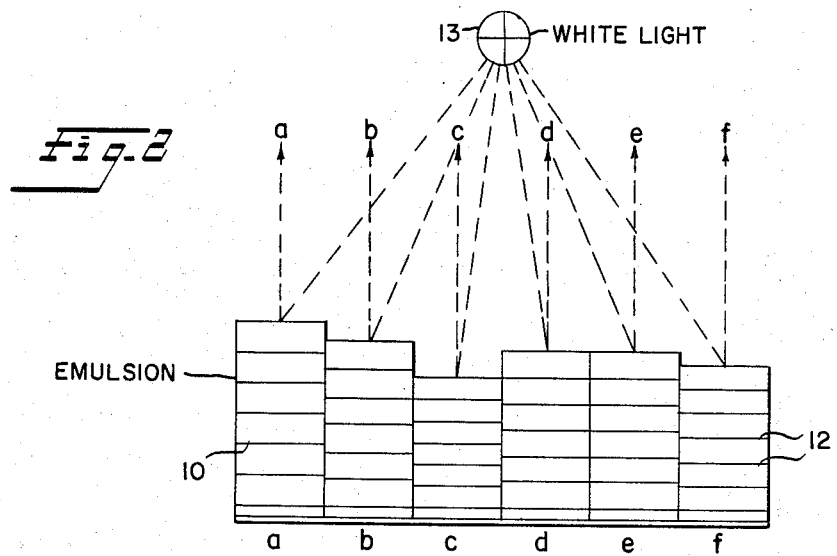
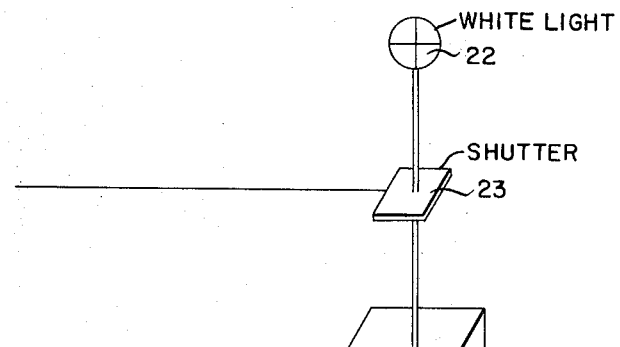
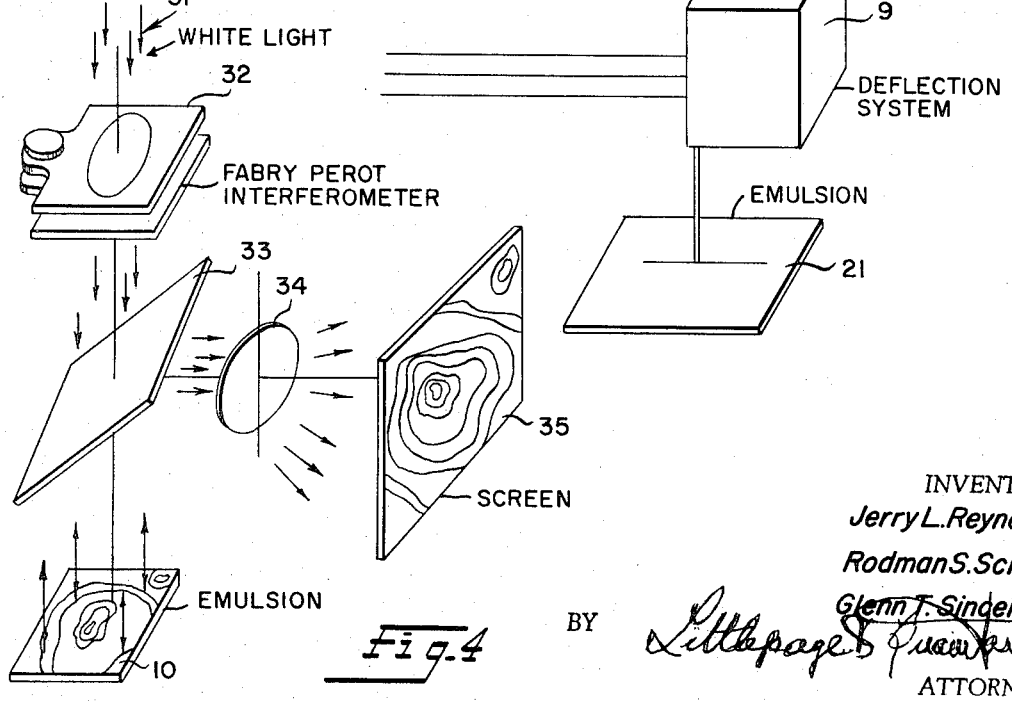
INVENTORS
Jerry L. Reynolds
Rodman S. Schools
Glenn T. Singerbox
BY
ATTORNEYS

United States Patent Office 3,555,545
Patented Jan. 12, 1971

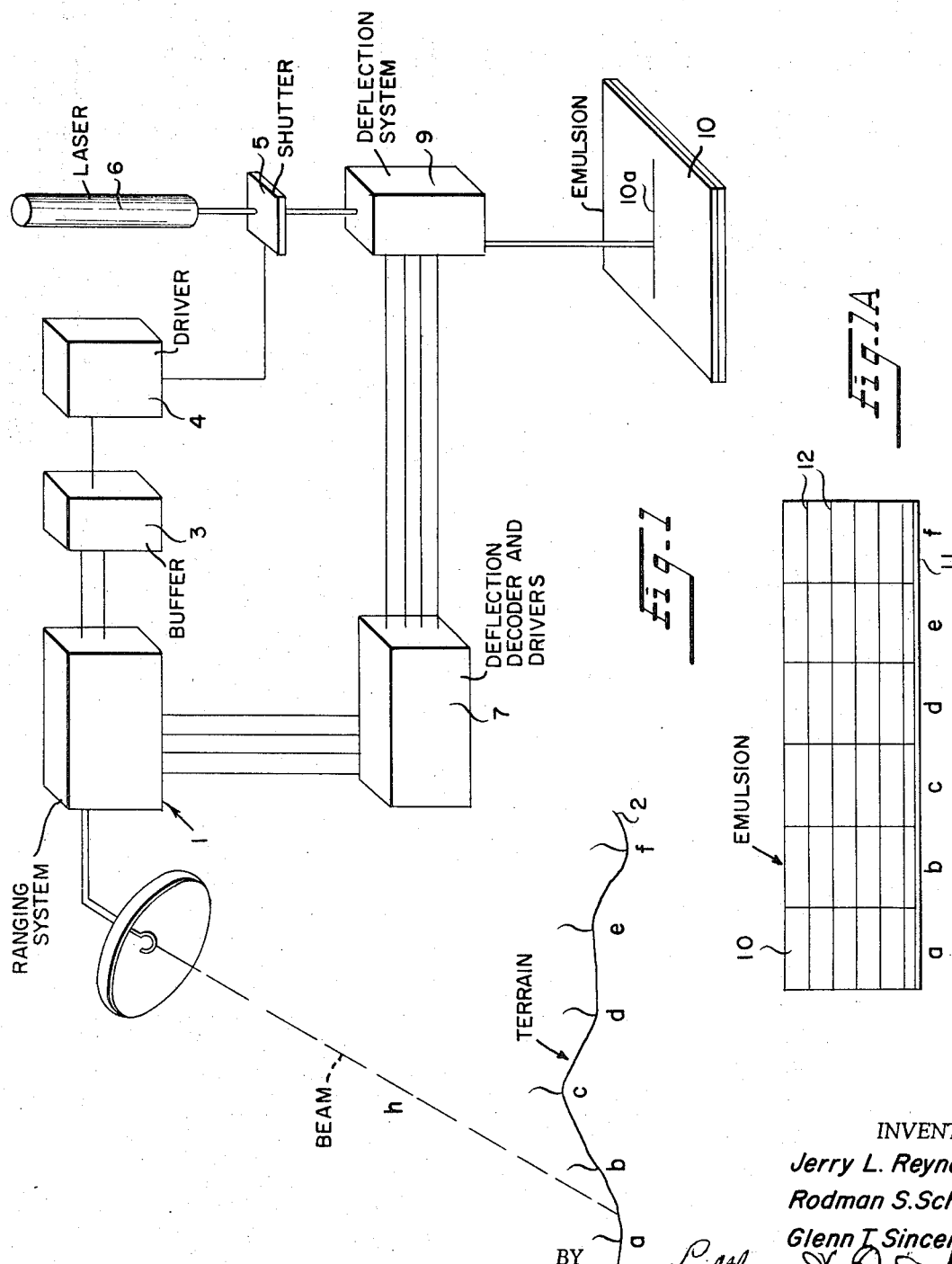

3,555,545
SYSTEM OF RECORDING IN RADIATION SENSITIVE MEDIUM
Jerry L. Reynolds, Wappingers Falls, Rodman S. Schools, Poughkeepsie, and Glenn T. Sincerbox, Wappingers Falls, N.Y., assignors to International Business Machines Corporation, Armonk, N.Y., a corporation of New York
Filed July 12, 1966, Ser. No. 564,620
Int. Cl. G01s 9/00; G02b 5/12
U.S. Cl. 343—5                                14 Claims

ABSTRACT OF THE DISCLOSURE

A beam of monochromatic light is directed successively to loci of a photosensitive emulsion having a reflective surface to form standing waves in the film and produce strata of sensitized surfaces by the process known as Lippmann photography. The intensity of the beam is controlled by a variable quantity, so that the amount of sensitized constituent of the emulsion at each locus is dependent on the value of one quantity which controls the beam. Development of the emulsion removes the unsensitized constituent and causes shrinkage of the emulsion so that the thickness of the developed emulsion is inversely proportional to the intensity of the light beam at each locus and is a measure of the value of the quantity.

This system and method may be used with a ranging system which scans the terrain from an elevated position, such as in an aircraft. The beam of the ranging system measures the distance of each point as by radar, the ranging system then controlling the intensity of the light beam to record the distance values on the photosensitive emulsion.

---

This invention relates to a system for and method of recording a variable quantity in a radiation sensitive layer by monochromatic light and exhibiting the quantities recorded by reflected light from said medium.

In the process known as Lippmann photography, standing waves of light are formed in a photosensitive emulsion, producing sensitized strata, i.e., a developable latent image of exposed silver halide, in the emulsion which correspond to the antinodes of the waves for any one wavelength. This emulsion is then treated by developing and fixing in the usual manner, forming reflecting strata of metallic silver in the emulsion. When white light is directed to the film, the equally spaced reflecting silver strata of each wavelength reflect only the wavelength in the emulsion which corresponds to the wavelength in the emulsion which formed them. This process is described in a paper by Fleisher et al., An Optical Accessed Memory Using the Lippmann Process for Information Storage, in Optical and Electro-Optical Information Processing, James T. Tippett et al., Eds., Chapter 1, p. 1, M.I.T. Press, 1965. An improvement which may be used in the present system is described in application Ser. No. 517,571, filed Dec. 30, 1965, by Schools and Sincerbox on Wave Energy Recording in Radiation Sensitive Medium.

The process as theoretically outlined differs in actual practice because of shrinkage of the emulsion resulting from the removal of the excess silver halide. This decrease in thickness also reduces the spacing between the reflecting silver strata, so that the reflected wavelength will be shorter than the wavelength of the original radiation. If the emulsion has been exposed to light of high intensity for a substantial time, only a relatively small amount of the silver halide remains to be removed and shrinkage is slight. If the exposure is very short, more of the silver halide will be removed and the silver strata will be much more closely spaced and the change in wavelength of reflected radiation is much greater. This shrinkage effect and consequent change in wavelength of light reflected by the silver strata in the emulsion is in inverse proportion to the amount of radiation falling on the emulsion. The range between zero change and maximum change in wavelength may be as great as 2,000 A.

This invention resides in a system and method to utilize this phenomenon for recording a variable quantity in a photosensitive emulsion by standing waves of monochromatic light in which each locus of the emulsion exposed to light is modified to form a periodic structure of reflective strata to represent one value of said variable quantity. The amount of light falling on the emulsion at each locus is controlled by the quantity measured, the antinodes of the standing waves of interfering radiations forming a periodic structure of equally spaced strata of sensitized silver halide in the emulsion. Upon development and fixing of the emulsion in the usual manner, strata of reflective metallic silver are formed and the excess silver halide is removed, causing shrinkage of the emulsion and, consequently, decrease in the spacing of the silver strata. This decrease in spacing of the strata is in inverse proportion to the amount of light on the emulsion so that the spacing of the strata at any one locus represents the amount of light and the value of the quantity measured. The quantity measured is exhibited by illuminating the emulsion with white light, or with light containing a range of wavelengths shorter than the initial recording wavelength, so that the spaced strata at each point will reflect light of a wavelength which represents the value of the quantity at that locus.

It is a principal object of this invention to utilize this phenomenon in recording three variable quantities simultaneously. Two of the variable quantities control movement in two directions of the recording medium or emulsion relatively to the light radiation, so that movement in each direction represents one of the variable quantities, as in an X–Y recorder, while the third variable quantity controls the radiation which records in the medium. In this way, the position and reflected wavelength at any point in the medium will represent the three variable quantities, i.e., the system will function as an X–Y–Z recorder. The particular application of this system has been shown in apparatus for contour mapping of terrain, in which each recording locus represents two coordinates of a point in the terrain and the wavelength of light reflected at the locus represents the third coordinate or the distance (or height) of the point.

It is a further object of this invention to record any variable quantity by controlling the amount of monochromatic light forming standing waves in the emulsion of a record film. This control by the variable quantity may vary the duration of the light, similar to the time interval of a radar ranging device, or may change the intensity of the light with changes in the quantity measured.

A more specific object of this invention is the mapping of varying elevation of a terrain and recording elevation at corresponding loci in the emulsion of a film which represents the terrain. The terrain is scanned by a ranging device using a radar or laser beam, and the measurements of time interval of beam reflection, i.e., the distance between the transmitter and ground surface, is used to control the duration of exposure to a beam of monochromatic light. The film emulsion when exposed to standing waves formed by this light at loci corresponding to positions on the terrain will then represent the elevation of the terrain, and the contours may be mapped by illuminating the film with light of shorter wavelength, showing the variations in elevation by different colors reflected by the emulsion.

In its broader aspects, the invention contemplates the use of electromagnetic radiation of substantially a single wavelength and produces standing waves in a radiation sensitive medium, and controls the radiation by a variable quantity to modify the radiation reflective properties of the medium, so that the reflection of radiation by the medium which exhibits the recorded quantity will represent the measure of the quantity.

In another of its aspects, the principle of varying the thickness of the emulsion with the amount of light on the emulsion may also be applied. In the silver halide emulsion, changes in intensity of the light on the film will cause variation in the excess of silver halide which may be removed on developing and fixing, so that the thickness of the emulsion is decreased in proportion. Substantially coherent light of a laser may be used, in the manner described in the above application of Schools and Sincerbox.

The foregoing and other objects, features and advantages of the present invention will be apparent from the following more particular description of a preferred embodiment of the invention as illustrated in the accompanying drawings:

FIG. 1 illustrates diagrammatically the system for mapping terrain directly on film.

FIG. 1A is a diagrammatic view of the structure formed in the film.

FIG. 2 illustrates diagrammatically the principle of the action of the emulsion used as a recording medium, and exhibiting the record formed by the film.

FIG. 3 shows a system for forming a mask on film which may be used to make a record in accordance with the invention.

FIG. 4 shows how the record formed by the invention may be exhibited for mapmaking.

In a specific application of the principles of this invention, a region of terrain is scanned by a beam of a microwave or laser ranging system 1 as shown diagrammatically in FIG. 1. Such systems are well known and determine the distance of each point on the region by the elapsed time of a pulse which is transmitted to and reflected back by the beam. Applicant utilizes this distance measuring system or radar to control the light of a coherent monochromatic light source for recording. The ranging system or radar scans a line 2 across the terrain being mapped, the time of the pulses transmitted and reflected from points $a$ to $f$ varying with the distances of the points. These pulses through a buffer 3 and driver 4 operate to open shutter 5 with each transmission of a pulse and close the shutter with return of the reflected pulse. This shutter 5, which may be an electro-optic type, such as a Kerr cell, controls the beam of a laser 6, which is deflected by deflection system 9 operated by the deflection decoder and drivers 7 of the ranging system. The beam 6 moves over the emulsion 10 in a line 10a synchronously with the movement of the radar beam from the ranging device 1 in line 2 over the terrain, thus recording in loci in the emulsion 10 along a line in one direction corresponding to points on the terrain. Successive lines are scanned and the points on these lines will correspond to a coordinate in a second direction, the points corresponding to coordinate points in a plane.

As shown in FIG. 1A, the emulsion 10 which the laser beam falls on has a reflecting surface 11 such as mercury in contact with the emulsion, the coherent monochromatic light from laser 6 being reflected back through the emulsion to form interfering standing waves in the emulsion, and the antinodes of the standing waves forming peaks of maximum energy in surfaces or strata 12.

The antinodes of the standing waves or peaks of maximum energy sensitize the silver halide of the emulsion at each locus, the antinodes forming equally spaced surfaces or strata of the sensitized silver halide, as indicated diagrammatically at 12 in FIG. 1A. These loci $a$ to $f$ in the emulsion represent the recording spots corresponding to points $a$ to $f$ along line 2 on the terrain being scanned by radar system 1. The strata 12 in the emulsion 10 formed by antinodes of standing waves of a single wavelength are equally spaced one-half wavelength, but the amount of sensitized material in each locus will be in proportion to the duration of the light beam at that locus.

Following the recording of the points of the terrain in the record emulsion 10, the emulsion is developed and fixed in known manner, the sensitized silver halide becomes metallic silver, and the excess unsensitized silver halide is removed. The metallic silver remains in the equally spaced surfaces or strata 12 at each locus, forming a periodic structure of a series of reflecting surfaces which will reflect light of a wavelength exactly twice the spacing of the strata 12.

The spacing of these strata will vary with the amount of light falling on each locus $a$ to $f$ due to shrinkage of the emulsion with the removal of silver halide. The effect of the differences in duration of light controlled by radar scanning of points $a$ to $f$ along line 2 is represented diagrammatically in FIG. 2. The farthest point $a$ will require the longest time for the beam to go and return to the antenna and the duration of the laser beam on emulsion 10 will be long. The silver halide at locus $a$ in the emulsion will change to silver with little excess halide and the shrinkage will be slight, with a small change in spacing of the strata of metallic silver.

At point $c$ on line 2, the distance of the travel of the radar beam is short, and the duration of the light beam at locus $c$ in the emulsion is also short. A large portion of silver halide will remain and its removal on development and fixing will cause a large shrinkage of the emulsion and the spacing of the strata of silver will be decreased correspondingly. The strata 12 in FIG. 2 illustrate this principle, the spacing of the strata representing one half wavelength, while the emulsion may include a large number of strata.

The values of the quantity as recorded in the emulsion of FIG. 2 may be exhibited by exposing the emulsion to white light from a source 13. The several loci corresponding to the distance of points on the terrain scanned will reflect light of a wavelength shorter than the monochromatic light of the laser beam, as the spacing of the strata is decreased. The wavelength reflected at each locus will vary with the duration of the recording light on the emulsion and therefore this wavelength will be a measure of the distance of the corresponding point on the terrain. The locus at $a$ will reflect the longest wavelength representing the longest distance and the locus $c$ will reflect the shortest wavelength in beam $c$ representing the shortest distance, each selected wavelength being shown at $a$ to $f$ in FIG. 2. If only certain wavelengths are projected on the emulsion, contour lines will be exhibited of the lines reflected by those wavelengths. In this way, the different points or contour lines will appear in different colors according to elevation of the terrain.

In FIG. 3, a system is shown for accomplishing this objective by producing a mask from a film emulsion 21 to be used later for recording on the same principle. A light 22 is controlled by a shutter 23 in the same manner as the laser beam in FIG. 1, and the beam scans the emulsion 21, the duration of the light at each locus controlling the density of the emulsion. After developing, the emulsion 21 is used as a mask for recording by standing waves in an emulsion in the Lippmann process. The light passing through the mask will vary in amount to produce differences in spacing of the strata as in the emulsion of FIG. 2, the denser loci in the mask representing the greater distances and causing the greater shrinkage corresponding to lesser wavelengths.

One manner of exhibiting the values recorded in the emulsion by the standing waves is illustrated in FIG. 4. White light 31 is passed through an adjustable Fabry Perot interferometer 32 and a beam splitter 33 to the film emulsion 10 of this invention shown in FIG. 2. The interferometer is adjusted so that wavelengths corresponding to certain wavelength spacing representing, for example, 50 or 100 feet elevation of the terrain, are transmitted to the emulsion 10. When these wavelengths are reflected from the emulsion and from the beam splitter to a lens 34, the contour lines in different colors will be projected onto screen 35. The contour map on screen 35 can be inspected immediately or can be copied for future reference. The screen may contain an overlay of a transparent map in which other features are represented.

The Lippmann process of exposing and developing an emulsion containing a photosensitive halide, such as silver, gold or platinum halide, is a convenient method of reducing the thickness of a layer by the action of light and may be easily read by reflected light as described. It is also contemplated that other substances and processes may be used to record by varying the thickness of material and may be scanned by other methods to read the record. A thermoplastic material in which charges are applied to the surface, will be deformed by light projected on the surface. Polyvinyl alcohols containing chromium salts will harden and shrink where exposed to light. Certain diazo plastic compounds increase in thickness under light. These variations in thickness may be read by such known means as by light interference.

While preferred embodiments of the invention have been shown and described herein, it is to be understood that the invention is not limited to these embodiments or their details, and that departures may be made therefrom within the spirit and scope of the invention as defined in the appended claims.

We claim:

1. In a system of recording three variable quantities by action of electromagnetic radiation at loci in a radiation sensitive medium in which said radiation and medium are relatively movable in each of two directions under control of two variable quantities, respectively, a radiation sensitive medium, means to sensitize said medium and establish a periodic structure of equally spaced reflective strata at each locus exposed to radiation in said medium, including electromagnetic radiation means of a single wavelength to form standing waves of interfering radiations at a locus in said medium, and means to control said electromagnetic radiation means by a third variable quantity to space said reflective strata at each locus as a function of said variable quantity.

2. In a system of recording three variable quantities by action of substantially monochromatic light at loci in a photosensitive medium in which said light and medium are relatively movable in each of two directions under control of two variable quantities, respectively, a photosensitive medium, means to sensitize said medium and establish a periodic structure of equally spaced reflective strata at each locus exposed to light in said medium, including substantially monochromatic light to form standing waves of interfering light at each locus in said medium, and means to control said light by a third variable quantity to space said reflective strata at each locus as a function of said third variable quantity.

3. In a system as defined in claim 2, in which said means to control said light controls the duration of light at each locus and thereby space said reflective strata as a function of the duration of said light.

4. In a system of recording three variable quantities by substantially monochromatic coherent light at loci in a photosensitive medium in which said light and medium are relatively movable in each of two directions under control of two variable quantities, respectively, a photosensitive medium, means to modify the light reflective properties of said medium at each locus exposed to light in said medium comprising interfering radiations of substantially monochromatic coherent light to form standing waves of interfering radiations in said medium and establish peaks of energy in said medium at the antinodes of said standing waves to form reflective strata at the loci of said antinodes, and means to control said radiations by a third variable quantity to modify said properties to represent said variable quantity.

5. A system of recording and exhibiting graphically three variable quantities comprising a photosensitive medium and radiations of substantially monochromatic light, means to establish a periodic structure of equally spaced reflective strata at a locus exposed to light in said medium including interfering radiations of said substantially monochromatic light, means to move said light radiations and said medium relatively in each of two directions under control of each of two variable quantities, respectively, means to control said light radiations by a third variable quantity to space said reflective strata at each locus as a function of said third variable quantity, and means to expose said medium with said reflective strata to radiation of selected wavelengths representative of certain values of said third variable quantity so that the loci exhibited will form contour lines representative of said third variable quantity.

6. A system of recording a variable quantity in a photosensitive medium at loci representative of different values of said quantity, said system comprising an emulsion containing a photosensitive metallic halide, means to form a periodic structure of equally spaced reflective strata at each locus in said emulsion representting a value of said quantity, said means including interfering radiations of monochromatic light to form standing waves at each locus in said emulsion, the energy peaks of said standing waves being equally spaced at each locus to react with said metallic halide, and means to gauge said quantity and to control said light to produce said spaced strata at each locus corresponding to the value of said quantity represented at said locus.

7. A system of recording a variable quantity at different loci comprising a layer of a substantially homogeneous material for a recording medium which has a constituent sensitive to electromagnetic radiation, means to transmit electromagnetic radiation in said layer, means to gauge said variable quantity and to control the amount of radiation at each locus in said layer to sensitize said constituent to represent a value of said quantity, means to treat said medium after exposure to said radiation to remove excess of said constituent which has not been sensitized by said radiation and reduce the thickness of said layer by removal of said unsensitized constituent, so that the loci in said layer to exhibit the value of said quantity tity, and means to measure the thickness of said layer at the loci in said layer to exhibit the value of said quantity at each locus.

8. A system of recording a variable quantity at a plurality of loci comprising a layer of a photosensitive medium containing a photosensitive metallic halide, means to form standing waves of substantially monochromatic light in said layer, means to gauge said variable quantity and to control the amount of said light falling on said layer of emulsion at each locus representing a value of said quantity, means to treat said emulsion to form equally spaced strata of metal from said metallic halide exposed to the antinodes of the standing waves of said light and to remove the excess metallic halide, so that said layer is reduced in thickness and the spacing of the metallic strata is decreased, and means for exhibiting said record by exposure to wavelengths of light shorter than said monochromatic light, the wavelength of reflected light at each locus representing the value of said quantity.

9. A system of recording the duration of a time interval comprising a photosensitive medium having a metallic halide, means controlled by the duration of a time interval to expose a locus of said medium to standing waves of interfering radiations of substantially monochromatic light, said medium upon development forming metallic reflective strata and shrinking with removal of excess metal halide to reduce the thickness of said medium and spacing of said strata, and means to project light on said medium of shorter wavelength than said initial radiations so that said spaced strata will reflect light of a wavelength which will measure said time interval.

10. A system of recording distance comprising a distance measuring apparatus, a photosensitive emulsion having a metallic halide, means to establish a periodic structure of metallic reflective strata in said emulsion including substantially monochromatic light means to form standing waves of interfering radiations at a locus in said emulsion, and means operated by said distance measuring apparatus to control said light means to space said strata as a function of the distance measured.

11. A system of mapping the elevations of terrain comprising a layer of a photosensitive emulsion containing a silver halide, means to form standing waves of substantially monochromatic light in said emulsion at loci in said emulsion corresponding to points on said terrain, means to gauge the elevation of points on the terrain, means to control the amount of light falling on said emulsion at each locus corresponding to each point on said terrain by said means to gauge the elevation of points on said terrain, means to treat said emulsion to form equally spaced reflective metallic silver strata and remove the excess silver halide in said emulsion, said treatment reducing the thickness of said emulsion and decreasing the spacing of said strata at each locus in said emulsion in proportion to the amount of light falling on said emulsion and the elevation of corresponding points on said terrain, and means projecting light of shorter wavelengths than said monochromatic light on said emulsion so that the reflective strata at each locus in said emulsion which corresponds to said wavelengths will reflect a wavelength representative of said spacing at that locus and the distance of the corresponding point on said terrain to exhibit the elevation of the terrain.

12. A radiation ranging device having means for transmitting pulses and receiving reflected pulses to measure the time elapsed and distance of points in a reflecting region, a recording medium comprising a layer of a photosensitive emulsion, means for forming standing waves of substantially monochromatic light at loci in said emulsion corresponding to points in said region, means controlled by transmission and reflection of said pulses to expose emulsion at each locus to standing waves of said light during the time lapse of said pulse to form equally spaced sensitized strata, means to treat said emulsion to form reflective strata of said sensitized strata, reducing the thickness of said emulsion and the spacing of said strata to represent the distance traveled by said radiation, means to expose said emulsion to light having wavelengths shorter than said monochromatic light, the light reflected from said strata exhibiting the distance of the points in the reflecting region.

13. The method of recording a representation of a variable quantity in a layer of photosensitive emulsion containing a metal halide comprising producing standing waves of a monochromatic light at loci in said emulsion corresponding to changes occurring in said quantity, controlling said light by said quantity so that the amount of light falling on any one locus represents said quantity, said standing waves forming equally spaced strata of sensitized metal halide in said emulsion, treating said emulsion to form reflective metal in said strata and remove the excess metal halide, said treatment reducing the thickness of said emulsion so that the spacing of the reflective strata at each locus is in proportion to the amount of light falling on the film, and exposing said emulsion to light including a range of wavelengths shorter than said monochromatic light, the wavelength of the reflected light at each locus exhibiting the representation of said quantity.

14. The method of recording a variable quantity in a radiation sensitive medium by varying the optical transmission and reflecting properties of said medium in loci representing values of said quantity, comprising forming standing waves of coherent radiation of a single wavelength in said medium to alter the optical properties of said medium in strata corresponding to the energy peaks of said standing waves, controlling the amount of said radiation at each locus by said quantity, treating said medium to alter the spacing of said strata to represent the amount of radiation falling on each locus and the quantity recorded, and exhibiting the values of said quantity by reflection of light from the loci of wavelengths corresponding to the spacing of the strata in each locus.

References Cited

UNITED STATES PATENTS

| | | | |
|---|---|---|---|
| 3,191,170 | 6/1965 | Lustig et al. | 343—5PR |
| 3,262,122 | 7/1966 | Fleisher et al. | |
| 3,314,073 | 4/1967 | Becker | 346—108X |

RODNEY D. BENNETT, JR., Primary Examiner

H. C. WAMSLEY, Assistant Examiner

U.S. Cl. X.R.

346—108

PO-1050
(5/69)

UNITED STATES PATENT OFFICE
CERTIFICATE OF CORRECTION

Patent No. 3,555,545          Dated January 12, 1971

Inventor(s) Jerry L. Reynolds, Rodman S. Schools, Glenn T. Sin(

It is certified that error appears in the above-identified patent and that said Letters Patent are hereby corrected as shown below:

> Column 6, Claim 7, lines 12-14, cancel the phrase "so that the loci in said layer to exhibit the value of said quantity tity", and insert --so that the thick of said layer forms a measure of the quantity--.

SIGNED AND
SEALED
MAR 16 1971

(SEAL)
Attest:

Edward M. Fletcher, Jr.
Attesting Officer

WILLIAM E. SCHUYLER, JR.
Commissioner of Patents